United States Patent
Patwardhan et al.

(10) Patent No.: US 10,736,030 B2
(45) Date of Patent: Aug. 4, 2020

(54) METHODS AND SYSTEMS FOR IMPROVED ACCESS POINT SELECTION IN A WIRELESS NETWORK

(71) Applicant: Hewlett Packard Enterprise Development LP, Houston, TX (US)

(72) Inventors: Gaurav Patwardhan, Santa Clara, CA (US); Sachin Ganu, Santa Clara, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 15/780,588

(22) PCT Filed: Feb. 12, 2016

(86) PCT No.: PCT/US2016/017794
§ 371 (c)(1),
(2) Date: May 31, 2018

(87) PCT Pub. No.: WO2017/138955
PCT Pub. Date: Aug. 17, 2017

(65) Prior Publication Data
US 2018/0359698 A1    Dec. 13, 2018

(51) Int. Cl.
*H04W 4/00* (2018.01)
*H04W 48/20* (2009.01)
(Continued)

(52) U.S. Cl.
CPC .......... *H04W 48/20* (2013.01); *H04W 24/08* (2013.01); *H04W 28/22* (2013.01); *H04W 84/12* (2013.01)

(58) Field of Classification Search
None
See application file for complete search history.

(56) References Cited

U.S. PATENT DOCUMENTS 6,975,604 B1    12/2005  Ishida et al.
8,363,617 B2    1/2013   Meyer
(Continued)

FOREIGN PATENT DOCUMENTS

CN    105246100 A    1/2016
EP    1048094        5/2006
(Continued)

OTHER PUBLICATIONS

George Athanasiou et al., "Dynamic Cross-layer Association in 802.11-based Mesh Networks," 2007, pp. 1-9.
(Continued)

*Primary Examiner* — Zewdu A Beyen
(74) *Attorney, Agent, or Firm* — Hanley Flight & Zimmerman, LLC

(57) ABSTRACT

Example methods and apparatus to generate recommendation(s) for access point association by a client device are disclosed. An example method includes calculating an effective uplink data rate for the client with respect to a first access point based on a) an uplink data rate and b) a percentage of uplink airtime available to the client. The example method includes calculating a first effective downlink data rate with respect to the first access point based on a) a downlink data rate for and b) a percentage of downlink airtime available to the client. The example method includes computing a first metric for the first access point based on the first effective uplink data rate, the first effective downlink data rate, and a noise floor scaling factor. The example method includes generating an access point recommendation by comparing the first metric and a second metric for a second access point.

14 Claims, 9 Drawing Sheets

(51) Int. Cl.
*H04W 24/08* (2009.01)
*H04W 28/22* (2009.01)
*H04W 84/12* (2009.01)

(56) References Cited

U.S. PATENT DOCUMENTS

| | | |
|---|---|---|
| 8,537,774 B2 | 9/2013 | Robson et al. |
| 2008/0056295 A1 | 3/2008 | Loda et al. |
| 2008/0253314 A1* | 10/2008 | Stephenson ........... H04W 24/08 370/326 |
| 2009/0046665 A1 | 2/2009 | Robson et al. |
| 2011/0201340 A1 | 8/2011 | Lunden et al. |
| 2011/0205969 A1* | 8/2011 | Ahmad ................. H04W 16/28 370/328 |
| 2012/0213072 A1 | 8/2012 | Kotecha et al. |
| 2015/0103812 A1 | 4/2015 | Zhao et al. |
| 2015/0245358 A1* | 8/2015 | Schmidt .............. H04L 43/0888 370/329 |
| 2016/0007226 A1 | 1/2016 | Kim et al. |
| 2016/0007278 A1 | 1/2016 | Gupta et al. |

FOREIGN PATENT DOCUMENTS

| | | |
|---|---|---|
| EP | 2963979 A1 | 1/2016 |
| WO | WO-2004/093336 A1 | 10/2004 |
| WO | 2015/028053 A1 | 3/2015 |

OTHER PUBLICATIONS

International Searching Authority, The International Search Report and the Written Opinion, dated Nov. 10, 2016, PCT/US2016/017794, 10 Pgs.

International Preliminary Report on Patentability received for PCT Patent Application No. PCT/US2016/017794, dated Aug. 23, 2018, 7 pages.

European Search Report and Search Opinion Received for EP Application No. 16890070.2, dated Jun. 12, 2018, 8 pages.

* cited by examiner

METHODS AND SYSTEMS FOR IMPROVED ACCESS POINT SELECTION IN A WIRELESS NETWORK

BACKGROUND

A wireless network, such as an 802.11 protocol-based wireless network, includes at least a station (STA) and a wireless access point (AP) interconnected by a distribution system (DS). A STA is also referred to as a wireless client or client device. The client device is associated with a single access point (AP) at a given time but can move between APs as the client device is physically moved and/or determines that another AP offers better operating conditions than its current AP. Conventional STAs rely on signal-to-noise ratio (SNR) information from received beacons from available APs to generate a list of available APs sorted by SNR value. Such an approach suffers, however, from multiple deficiencies and may be inaccurate or incomplete resulting in a misleading or less than ideal recommendation when prompting a client device to switch APs.

DETAILED DESCRIPTION

Figure 1:
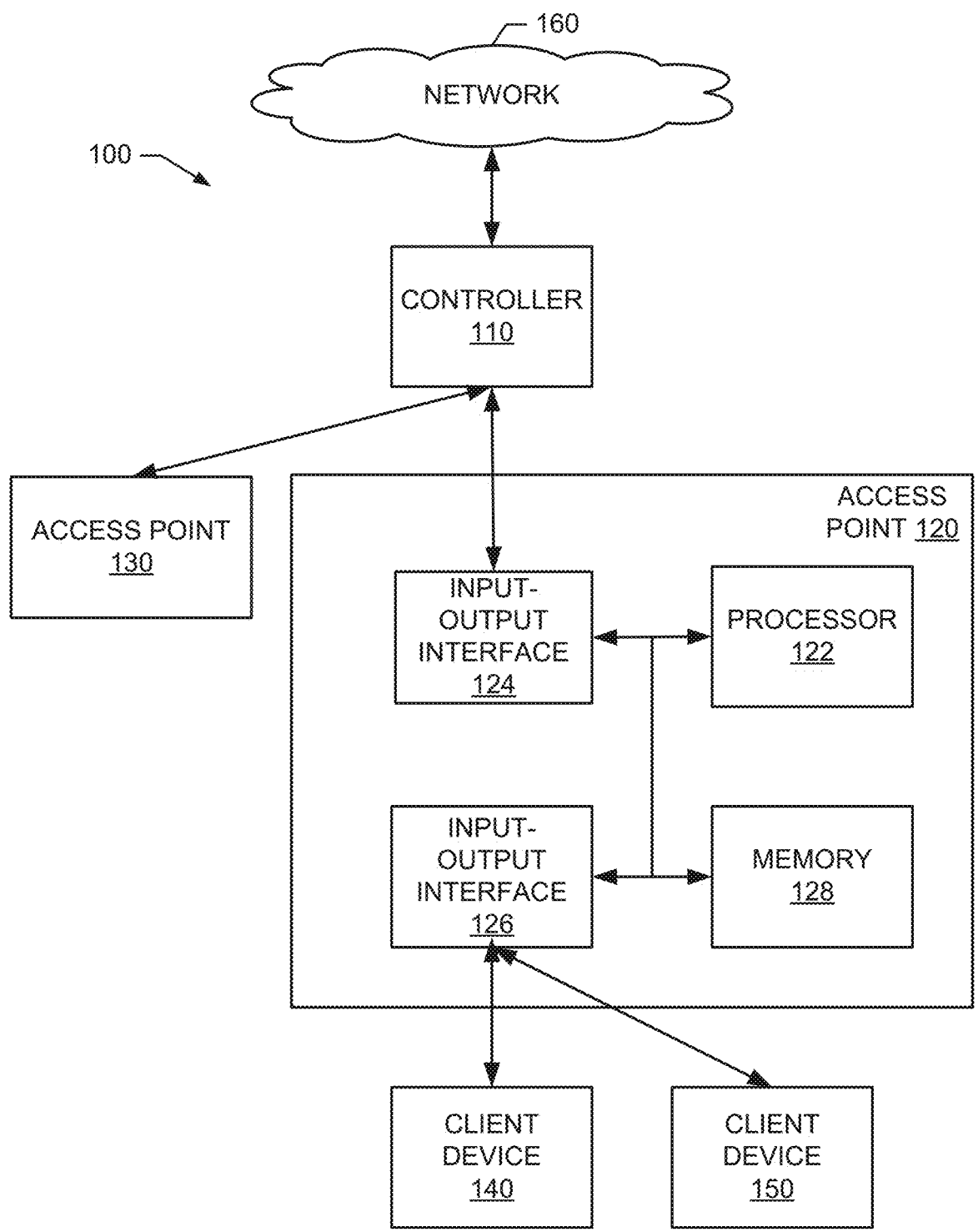
FIG. 1 illustrates an example network system including a controller, access points, client devices, and a network.

In the following detailed description, reference is made to the accompanying drawings that form a part hereof, and in which is shown by way of illustration specific examples that may be practiced. These examples are described in sufficient detail to enable one skilled in the art to practice the subject matter, and it is to be understood that other examples may be utilized and that logical, mechanical, electrical and other changes may be made without departing from the scope of the subject matter of this disclosure. The following detailed description is, therefore, provided to describe example implementations and not to be taken as limiting on the scope of the subject matter described in this disclosure. Certain features from different aspects of the following description may be combined to form yet new aspects of the subject matter discussed below.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements.

In a wireless network, a wireless access point (AP) is a networking hardware device that allows wireless client devices to connect to a wired or wireless network via the AP. The AP can also serve as an arbiter to regulate network traffic at the AP to and/or from connected client device(s), for example. A client device is associated with a single AP at a given time but can move between APs as the client device is physically moved and/or determines that another AP offers better operating conditions than its current AP. Conventional systems rely on SNR information generated from received beacon packets provided by available APs to generate a recommendation for a client device. Additionally, some proposals have been suggested to evaluate both uplink data rate and downlink data rate as well as a client device population currently on a given AP to determine a desirability of association for various APs in an area. Such proposals, however, rely upon the client device itself to gather information via beacons and/or other 802.11 management frames and make a decision to associate with a particular AP.

Examples disclosed herein focus on network infrastructure, rather than a single client device that is unconcerned for other client devices, and provide overall access point stability and load balancing in the network topology and system. Examples disclosed herein leverage infrastructure information from the APs themselves to determine a Virtual Client Health (VCH) metric that is calculated to get a numeric value of a client's predicted experience on a target AP if the client device is moved to that AP. The VCH not only depends upon an SNR value received at the target AP (e.g., possible uplink data rate), but also on a number of clients at the target AP (e.g., a percentage of airtime possible for the client on the target AP), and the AP SNR value received at the client device (e.g., downlink data rate). The VCH provides an estimate of how much data the client device will actually be able to send via the target AP versus an amount of data the client 'thinks' it can send if it just used the SNR value as a measure of selecting an AP.

While SNR-based approaches are typically limited to a particular client's view of the network, certain examples provide a view from the network infrastructure for improved AP selection by the network infrastructure for the client. Certain examples define the VCH metric which evaluates a number of client devices associated with a target radio (a target AP) and provides an improved indicator for subsequent AP selection by a client device. By comparing VCH at each AP for a selected client device, the wireless network infrastructure can make better decisions selecting a preferred AP for each client device. VCH can be used to populate certain information elements in 802.11 management frames (e.g., Quality of Service (QoS) Basic Service Set (QBSS) Load Information Element (IE), Basic Service Set (BSS) Transition Management, etc.) to assist the client in selecting a better AP radio for association.

Certain examples combine a highest achievable data rate (e.g., an SNR value at a target AP) with airtime contention (e.g., transmit opportunities at the target AP) to create the VCH, which can also be interpreted as an effective data rate to be used by the client device. For example, in a wireless network having one AP and one client device, the data rate at which the client connects to the AP is a measure of how much data is passed through the AP. If the AP has other client(s) connected to it, the time on the AP is shared. Thus, even though the client of interest may be connected to the AP at a good data rate, the client may pass less traffic through the AP given competing transmissions of the other connected client(s). Therefore, the data rate (which is in direct relation with the SNR value) is not the only measure for selecting the best AP for the client to connect. Instead, VCH values can be used to sort APs from most desirable (e.g., highest score on the VCH metric) to least desirable (e.g., lowest score on the VCH metric). A value for the VCH metric can be calculated as VCH=Function of (Potential Uplink Data Rate*time shared on medium+Potential Downlink Data Rate*time shared on medium by AP to send data to client under consideration).

By giving clients a better AP candidate using not only signal strength but also radio utilization at each AP, a client device is provided with an improved set of APs from which to choose for connection. A grading or ranking of APs can be conveyed to clients using 802.11k neighbor reports, in which APs can be sorted from most desirable to least desirable. AP grading information can also be used in a QBSS IE Load element per the 802.11e amendment, for example.

FIG. 1 illustrates an example network system 100 including a controller 110, APs 120, 130, client devices 140, 150, and a network 160. The client devices 140, 150 communicate with the network 160 via one of the APs 120, 130, which establishes a connection between the client device 140, 150 and the network 160 via the controller 110.

As shown in the example of FIG. 1, each AP 120, 130 is a digital device including a processor 122, one or more input-output interfaces 124, 126, and a memory 128. The processor 122, such as a MIPS-class processor (e.g., from Cavium, RMI, etc.) and/or other suitable processor (e.g., from Intel, ARM, AMD, etc.), can be used to process incoming and/or outgoing data from input-output interfaces 124, 126 and/or execute associated operations for data routing and communication between the network 160 and client device 140, 150 via the controller 110. The input-output interfaces 124, 126 can be wired and/or wireless interfaces to facilitate communication between the controller 110 and the client devices 140, 150. For example, the input-output interface 124 can be implemented as a wired interface (e.g., an IEEE 802.3 Ethernet interface, etc.) to connect the AP 120 to the controller 110 for communication with the network 160. The input-output interface 124 can also be implemented as a wireless interface (e.g., an IEEE 802.11 wireless interface including one or more radio transceivers at, for example, 2.4 GHz and/or 5 GHz wireless bands, etc.) in wireless communication with the controller 110. The input-output interface 126 can similarly be implemented as a wireless interface (e.g., an IEEE 802.11 wireless interface, including one or more radio transceivers at, for example, 2.4 GHz and/or 5 GHz wireless bands, etc.) for wireless communication between the AP 120 and client device(s) 140, 150. The memory 128 can include fast read/write memory to hold processor data and instructions while the processor 122 is operating, as well as non-volatile memory such as read-only memory (ROM) (e.g., electrically erasable programmable read-only memory (EEPROM), etc.) and/or flash memory to store files and startup information.

The example controller 110 similarly includes a processor, memory, and one or more input-output interfaces similar to the AP 120, 130. The controller 110 can coordinate AP 120, 130 communication with the network 160 and can serve as a central processor, switch, traffic regulator, etc.

Similarly, client devices 140, 150 are digital devices each including a processor, memory, wireless interface, and other interfaces as needed. Examples of wireless clients include but are not limited to handheld wireless devices such as tablets, bar-code scanners, wireless phones or communicators, computers including netbooks, notebooks, laptops, and desktop computers, as well as wireless infrastructure devices such as cameras, scales, and instruments.

An infrastructure of the network system 100 manages client devices 140, 150 through communication between APs 120, 130 and the controller 110, for example. For example, each AP 120, 130 maintains a table and/or other record of client information. The APs 120, 130 may share report information with each other and/or with the controller 110 and/or other central processor. In some examples, the controller 110 and/or other central processor processes AP client reports to determine a candidate AP 120 or set of APs 120, 130 for a client device 140, 150 and forwards the candidate information to APs 120, 130 in the group. In some examples, processing of client reports and associated client-AP relationship information can be spread across multiple APs 120, 130 and/or centralized in a single AP 120, 130 (e.g., the current AP 120 for a client device 140 of interest, etc.) rather than concentrated at the controller 110.

Information provided to APs 120, 130 in the group can include an indication of client devices that are not be associated with a given AP 120, 130. Alternatively or in addition, information provided to the APs 120, 130 can include likely or preferable associations between client devices 140, 150 and APs 120, 130 that can be used to recommend or influence a client device 140, 150 to connect to a particular AP 120, 130, for example.

Virtual Client Health Calculation

As discussed above, Virtual Client Health (VCH) is a metric that is calculated to generate a numeric value estimating or predicting a clients experience on a target AP if the client were to be moved to that AP. The VCH involves a SNR value received at the target AP (e.g., a possible uplink data rate), a number of other client devices at the target AP (e.g., representing a percentage of airtime possible on the target AP), and an AP SNR value received at the client (e.g., a downlink data rate). Since an AP and a client device have dissimilar transmit power levels, uplink and downlink portions of the VCH are calculated separately and combined to provide a VCH value. The computed VCH value provides an estimate of how much data the client can actually send via the target AP versus an amount of data the client expects it can send based on SNR value alone.

As mentioned above, the virtual client health metric can be calculated as follows:

$$\text{VCH}=\text{Effective Uplink Data Rate}+\text{Effective Downlink Data Rate} \quad \text{(Eq. 1)}.$$

To determine the Effective Uplink Data Rate, an actual Data Rate reported by the client device 140, 150 is multiplied by a percentage of time on the medium for the AP 120, 130 during which the client 140, 150 can send data. The Effective Downlink Data Rate can be computed similarly.

Updated accordingly, Equation 1 becomes the updated formula of Equation 2:

VCH=(% uplink airtime possible on target AP*Uplink data rate on target AP)+(% downlink airtime possible on target AP*Downlink data rate on target AP) (Eq. 2).

As mentioned above, the virtual client health metric can be calculated as follows:

$$VCH = \frac{\text{time spent by client } C \text{ for uplink data}}{\text{total time on medium for uplink data}} * \text{uplink data rate} \quad \text{(Eq. 3)}$$

$$\text{of client } C + \frac{\text{time spent by client } C \text{ for downlink data}}{\text{total time on medium for downlink data}} *$$

$$\text{downlink data rate of client } C.$$

Equation 3 can be re-written as follows:

$$VCH = \frac{UD_C/UDR_C}{\sum_{i=1}^{n} \frac{UD_i}{UDR_i}} * UDR_C * \alpha + \frac{DD_C/DDR_C}{\sum_{i=1}^{n} \frac{DD_i}{DDR_i}} * DDR_C * \beta, \quad \text{(Eq. 4)}$$

where variables in Equation 4 are defined as follows:

| | |
|---|---|
| VCH | Virtual Client Health |
| $UD_c$ | Uplink Data sent by client 'C'. |
| $DD_c$ | Downlink Data sent by client 'C'. |
| $UDR_c$ | Uplink Data Rate of client 'C'. |
| $DDR_c$ | Downlink Data Rate of client 'C'. |
| $UD_i$ | Uplink Data sent by client 'i'. |
| $UDR_i$ | Uplink Data Rate of client 'i'. |
| $DD_i$ | Downlink Data sent by client 'i'. |
| $DDR_i$ | Downlink Data Rate of client 'i'. |
| $\alpha/\beta$ | Uplink to Downlink traffic ratio. |

In the table and equation above, client 'C' is the client device 140, 150 for which the controller 110 and/or AP 120, 130 is calculating the VCH score. The index 'i' used for UDR, DDR, UD and DD has a range from 1 to 'n' and denotes existing client(s) 140, 150 at the target AP 120, 130. An Uplink to Downlink traffic ratio ($\alpha/\beta$) allows an adjustment to emphasize the uplink component or the downlink component or weight them equally to most accurately represent a state of the network system 100.

In certain examples, some parameter values can be assumed to simplify the Equation 4. For example, the uplink to downlink traffic ration, $\alpha/\beta$, can be assumed to equal "1" to assign equal weighting to traffic in the upstream direction as well as traffic in the downstream direction. Additionally, for example, it can be assumed that all clients 140, 150 pass the same amount of data in the downlink as they do in the uplink for the target AP 120, 130 ($\forall i$, $UD_i = UD_c$ & $\forall i$, $DD_i = DD_c$). While these values do not have to be assumed, in certain examples, assuming these values relaxes the VCH equation 4.

Uplink Component of the VCH Calculation

As discussed above, since an AP and a client device have dissimilar transmit power levels, uplink and downlink portions of the VCH are calculated separately and combined to provide a VCH value. The uplink component of the VCH equation 4 can be represented as:

$$VCH_U = \frac{UD_C/UDR_C}{\sum_{i=1}^{n} \frac{UD_i}{UDR_i}} * UDR_C. \quad \text{(Eq. 5)}$$

Using assumptions, this can be simplified to:

$$VCH_U = \frac{1}{n} * \frac{1}{\sum_{i=1}^{n} \frac{1}{UDR_i}}. \quad \text{(Eq. 6)}$$

Figure 2:
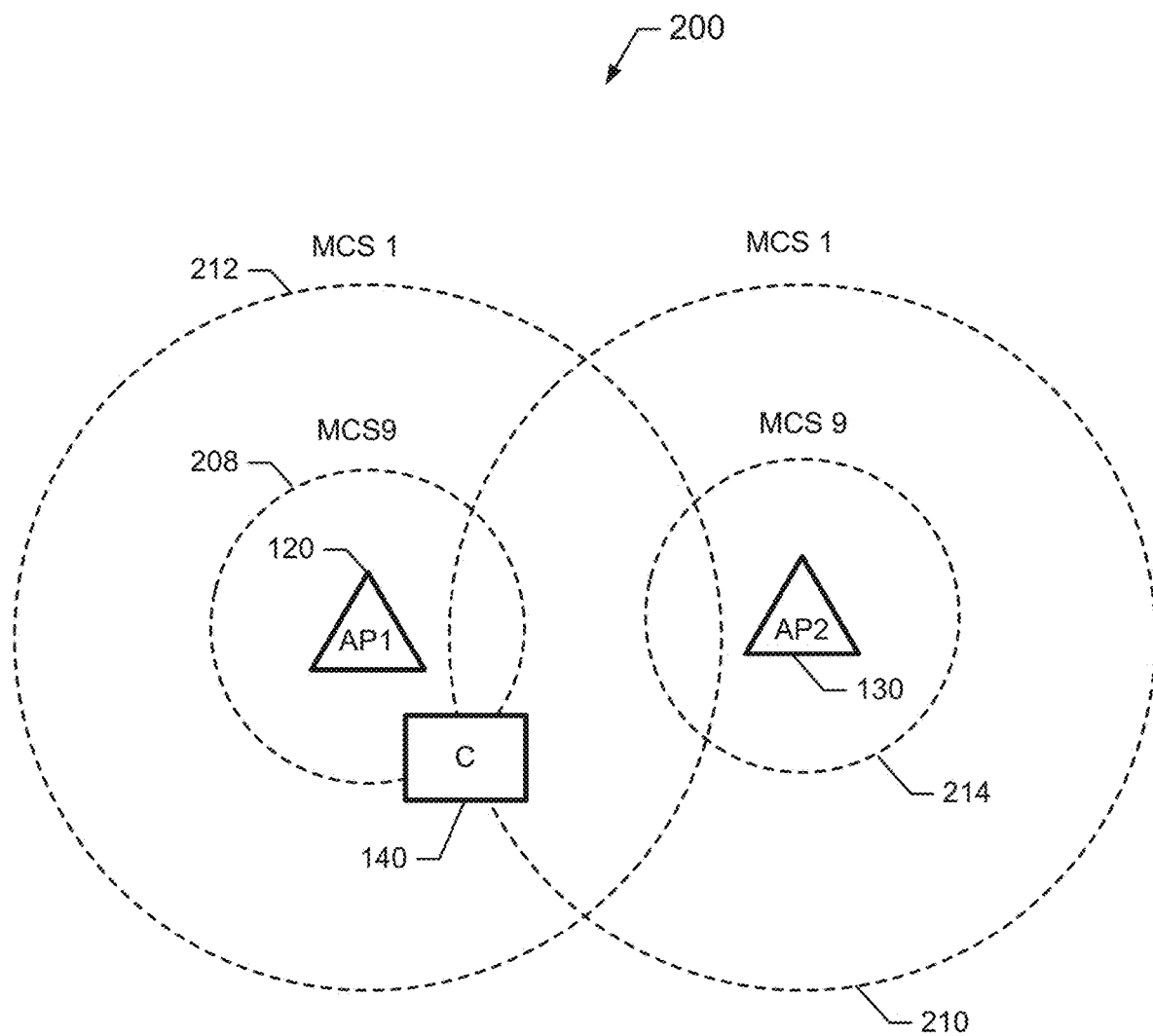
FIG. 2 illustrates an example network topology including a client device that is currently associated with an access point and is within communication range of two additional access points.

FIG. 2 illustrates an example network topology 200 including a client device, 'C', 140 that is currently associated with an AP3 (not shown) but is within communication range of AP1 120 and AP2 130. As used in the example of FIG. 2, data rate/speed is quantified according to a modulation coding scheme (MCS) which can range from 0 to 9 based on modulation type, coding rate, and available channel(s). The values used in the example of FIG. 2 are for illustration only, and different MCS values can be mapped to the example instead.

Returning to the example of FIG. 2, the client 140 is at a range 208 of modulation coding scheme (MCS) 9 of AP1 120 and a range 210 of MCS1 of AP2 130. AP1 120 and AP2 130 have different channels for communication. The example network topology 200 of FIG. 2 can be used to compare AP selection for the client 140 using both a VCH-based method and a legacy SNR-based method.

Initially, the example network topology 200 assumes that there are no client devices currently connected to AP1 120 or AP2 130, and a processor (e.g., one or more APs 120, 130 and/or a central processor (e.g., the controller 110 of FIG. 1)) is evaluating which available AP 120, 130 is most suitable for the client device 140.

Considering only a SNR of the client 140 at each AP 120, 130, a determination indicates that client 140 should connect to AP1 120 because the client device 140 will achieve a data rate of MCS9 208 at AP1 120, rather than a data rate of MCS1 210 at AP2 130. Additionally, computing VCH results in the same answer since client C 140 will be the only client on the target AP 120, 130. As a result, the client 140 will have 100% of the airtime available, thus reducing the calculation of Equation 4 to a pure SNR value for each potential target AP 120, 130.

Case 1.

Adding client devices at AP1 120 and/or AP2 130 provides further evaluation of different use cases. For example, suppose n client devices are currently associated with AP1 120 at MCS9 208. If only SNR is considered, then AP1 120 would be the recommended node since the client 140 is at MCS9 with respect to AP1 120 and only at MCS1 with respect to AP2 130.

However, when calculating the VCH, the uplink portion of the VCH formula (Equation 6) for AP1 120 is reduced as follows:

$$VCH_{U-AP1} = \frac{1}{n} * \frac{1}{\sum_{i=1}^{n} \frac{1}{UDR_i}}, \quad \text{(Eq. 6)}$$

$$VCH_{U-AP1} = \frac{1}{n} * \frac{1}{\sum_{i=1}^{n} \frac{1}{9}}, \quad \text{(Eq. 7)}$$

$$VCH_{U-AP1} = \frac{9}{n^2}. \quad \text{(Eq. 8)}$$

Similarly, the uplink equation for AP2 130 is reduced as follows:

$$VCH_{U-AP2} = \frac{1}{n} * \frac{1}{\sum_{i=1}^{n} \frac{1}{UDR_i}}, \quad \text{(Eq. 9)}$$

$$VCH_{U-AP2} = 1. \quad \text{(Eq. 10)}$$

Therefore, calculations for AP1 120 and AP2 130 yield $$VCH_{U-AP1} = \frac{9}{n^2}$$

and $VCH_{U-AP2}=1$. As a result, if fewer than three client devices are already present at AP1 120 at MCS9 208 (e.g., n<3), then, $VCH_{U-AP1}>VCH_{U-AP2}$. The higher the score, the more favorable the AP is for the client 140 to connect. Thus, unlike the legacy SNR method, the favorability of the AP choice for the client 140 to connect depends on a number of clients already on the target AP.

In this example, all client devices have good MCS rates (MCS9 208) with their associated AP1 120, and AP2 130 is only available for client 140 at a weaker MCS1 data rate. However, looking also at the percentage of airtime available to the client 140 on AP1 120 versus AP2 130, AP2 becomes more favorable to client 140, despite the weaker signal strength, as the number n of existing connected clients increases (e.g., n greater than 3, etc.) because client 140 will have less competition and, therefore, a greater percentage of available airtime with AP2 130.

Case 2.

In a second example, n client devices are associated at AP1 120 at MCS1 212. If only SNR of the client device 140 at each AP 120, 130 is considered, then the recommendation would indicate the client 140 should connect to AP1 120 to achieve a data rate of MCS9 208. Computing the VCH, however, results in a more nuanced and detailed analysis:

$$VCH_{U-AP1} = \frac{9}{n(9n-8)}, \quad \text{(Eq. 11)}$$

$$VCH_{U-AP2} = 1. \quad \text{(Eq. 12)}$$

For n=1, the VCH analysis yields $VCH_{U-AP1}>VCH_{U-AP2}$. For all other values of n, however, the client C 140 should connect to AP2 120 since $VCH_{U-AP2}$ will be always greater than $VCH_{U-AP1}$ in such cases.

Thus, client devices connected to AP1 120 have a bad MCS1 rate 212. If more than one client device is already connected to AP1 120, the client 140 is better off connecting to AP2 130 so that client C 140 will not be dragged down by poor performance of the other client devices at MCS1 212, even if the signal strength of AP2 130 is also at MCS1 210 for client device 140.

Case 3.

In a third example, n clients are associated with AP2 130 at MCS9 214. When evaluating a recommended destination for client device C 140, a SNR determination with respect to AP1 120 and AP2 130 indicates that client 140 should connect to AP1 120 since the client device 140 wants to achieve a data rate of MCS9 208. Looking at VCH, however, provides:

$$VCH_{U-AP1} = 9, \quad \text{(Eq. 13)}$$

$$VCH_{U-AP2} = \frac{9}{n(n+8)}. \quad \text{(Eq. 14)}$$

Based on a comparison of Equations 13 and 14, it is clear that for no value of n should the client C 140 connect to AP2 130 since $VCH_{U-AP1}$ is always $>VCH_{U-AP2}$.

Case 4.

In a fourth example, n clients are associated with AP2 130 at MCS1 210. Using the legacy SNR method, the client would be recommended to connect to AP1 120 to achieve a data rate of MCS9 208. Looking at VCH, however, provides:

$$VCH_{U-AP1} = 9, \quad \text{(Eq. 15)}$$

$$VCH_{U-AP2} = \frac{1}{n}. \quad \text{(Eq. 16)}$$

Thus, for no value of n should the client C 140 connect to AP2 130 since $VCH_{U-AP1}$ is always $>VCH_{U-AP2}$.

Case 5.

In a fifth example, n/2 clients are associated with AP1 120 at MCS1 212 and n/2 clients are associated with AP2 130 at MCS9 214. Considering SNR of the client 140 with respect to the APs 120, 130 indicates that the client 140 should connect to AP1 120 since the client 140 wants to achieve a data rate of MCS9 208.

Calculating VCH, however, provides:

$$VCH_{U-AP1} = \frac{9}{n(9n-8)}, \quad \text{(Eq. 17)}$$

$$VCH_{U-AP2} = \frac{9}{n(n+8)}. \quad \text{(Eq. 18)}$$

Figure 3:
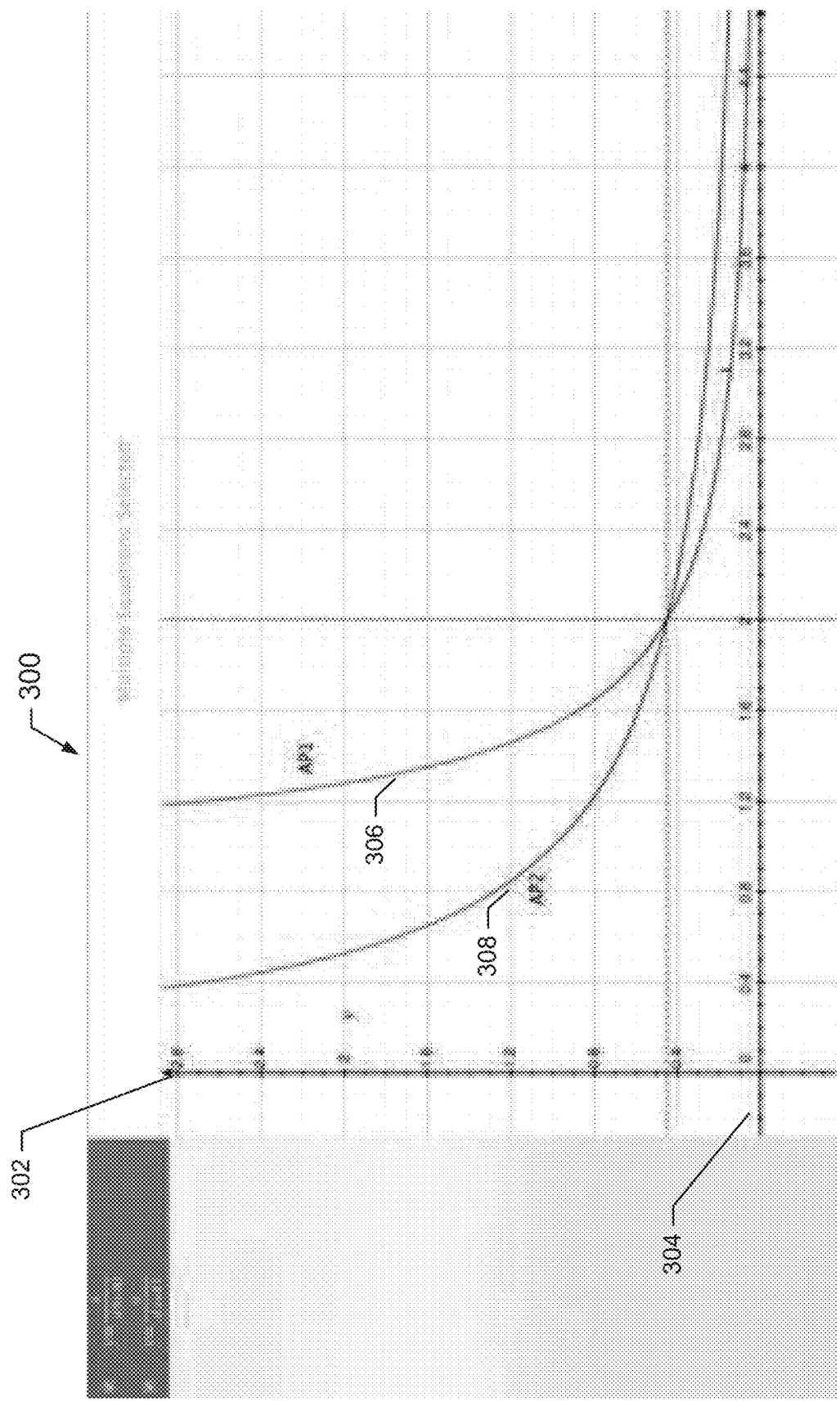
FIG. 3 shows an example plot of virtual client health versus a number of associated client devices for two example access points.

To evaluate which AP 120, 130 is better, Equations 17 and 18 can be plotted, as shown in the example of FIG. 3.

In the example plot 300 of FIG. 3, a Y-axis 302 represents the VCH value, and an X-axis 304 represents a number of associated client devices. AP1 120 is represented by a first curve 306, and AP2 130 is represented by a second curve 308. As shown in the graph 300, for less than two clients, $VCH_{U-AP1}>VCH_{U-AP2}$; for two clients, $VCH_{U-AP1}=VCH_{U-AP2}$; and for more than two clients, $VCH_{U-AP1}<VCH_{U-AP2}$.

Downlink Component of the VCH Calculation

As discussed above, uplink and downlink portions of the VCH are calculated separately and combined to provide a VCH value. The downlink component of the VCH equation 4 can be represented as:

$$VCH_D = \frac{DD_C/DDR_C}{\sum_{i=1}^{n} \frac{DD_i}{DDR_i}} * DDR_C. \quad \text{(Eq. 19)}$$

After applying assumptions, the downlink component becomes:

$$VCH_D = \frac{1}{n} * \frac{1}{\sum_{i=1}^{n} \frac{1}{DDR_i}}. \quad \text{(Eq. 20)}$$

To compute the VCH for the downlink component, a downlink data rate at the target AP 120, 130 should be determined for all clients. However, the AP and client transmit powers may not be same. Therefore, it is unknown at which data rate the target AP 120, 130 will transmit to the client 140 under consideration. For the uplink component of VCH, this is not an issue since the target AP 120, 130 is receiving the frames from the client 140 (e.g., while doing an off channel scan). However, rather than assuming that AP and client transmit powers are equal, an estimate of a downlink MCS rate can be determined from the target AP 120, 130 to the client 140 without actual data transfer between the AP and the client 140 as follows.

First, client transmit power is shown to be independent of AP transmit power. Once client transmit power and AP transmit power are shown to be independent, a graph of "Downlink Transmit MCS Rate of Target AP" versus "Last_ACK_SNR" (e.g., the SNR value of an acknowledgement (ACK) received from one of the clients associated with the Target AP). Then, a received SNR of the client 140 under consideration at the Target AP 120, 130 is obtained (e.g., using the SNR value obtained from off-channel scanning). Using this SNR, an estimate of the Downlink Transmit MCS Rate of Target AP can be determined for the client 140 under consideration.

Figure 4:
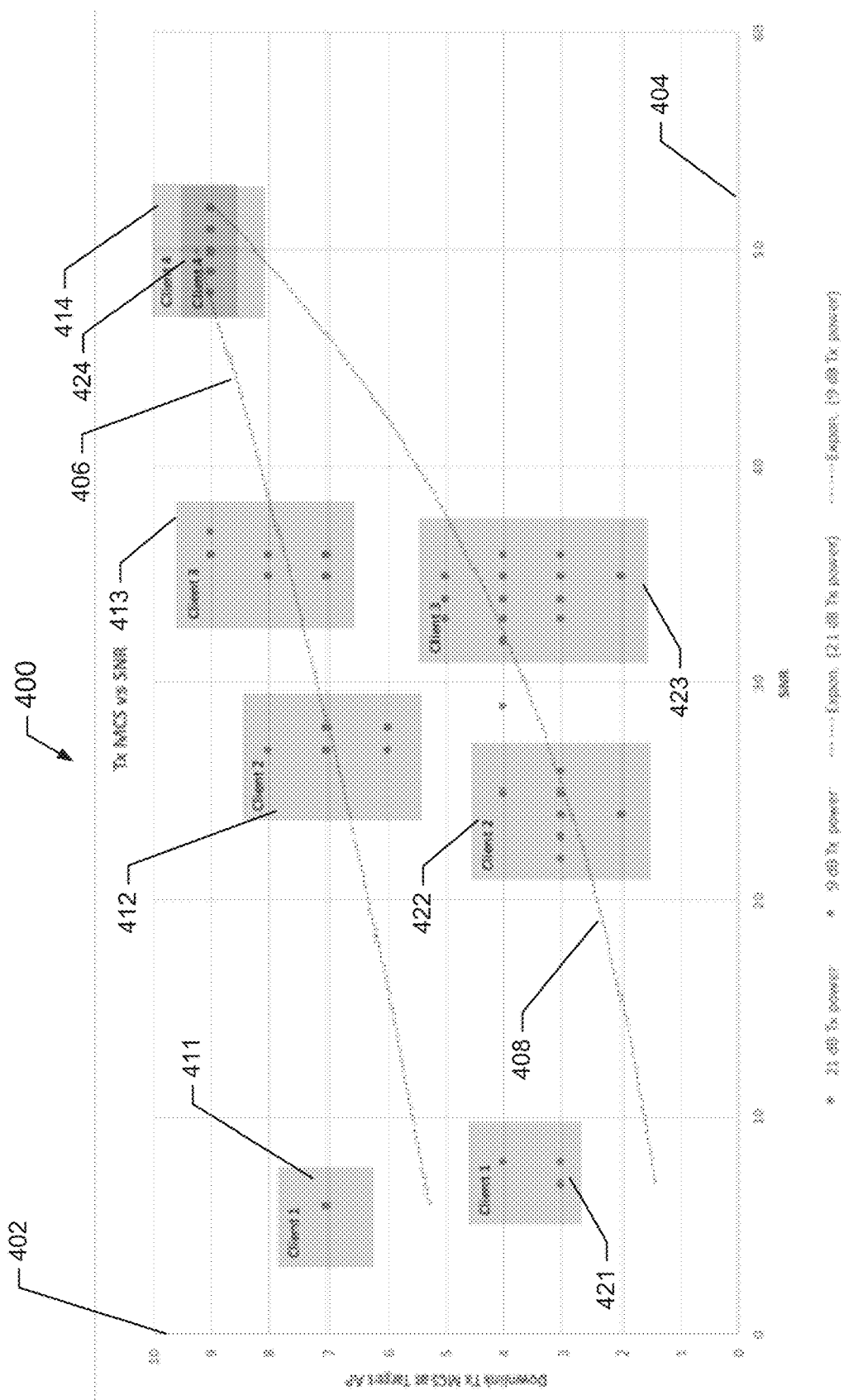
FIG. 4 shows an example graph comparing downlink transmit modulation coding scheme rate with a last acknowledgement signal-to-noise ratio for a plurality of example client devices at first and second example access point transmit power levels.

For example, client transmit power can be shown to be independent of AP transmit power through experimentation, as shown in the example of FIG. 4. In the example graph 400 of FIG. 4, downlink transmit MCS rate 402 and last acknowledgement SNR 404 are compared for a plurality (e.g., four) of client devices at first 406 and second 408 transmit power levels.

The example graph 400 shows readings for all clients 411-424 such that the Y-axis 402 maps the Downlink Tx MCS at a target AP, and the X-axis 404 shows the values for the Last_ACK_SNR. Two such plots 406, 408 are provided. The first line 406 includes readings at an AP transmit power of 21 dB. The second line 408 includes readings at an AP transmit power of 9 dB. Curve fitting is used to show the trend of the data using an exponential function.

For example, looking at client 3 413, 423, the example graph 400 illustrates that a change in the AP transmit power from 21 to 9 dB did not trigger a corresponding change in the Last_ACK_SNR 404 reading (e.g., with +/−1-2 dB error margin as shown by the difference of 413 and 423 values on axis 404). Client 1 411, 421, client 2 412, 422, and client 4 414, 424 behaved similarly.

The consistency in received ACK packet SNR demonstrates that client transmit power is not dependent on the AP transmit power. Therefore, using a graph, such as the example graph 400, for a target AP and its associated client devices, a fair approximation of Downlink Transmit (Tx) MCS Rate at the target AP can be determined based on a receive SNR of a client device evaluating association with the target AP.

Figure 5:
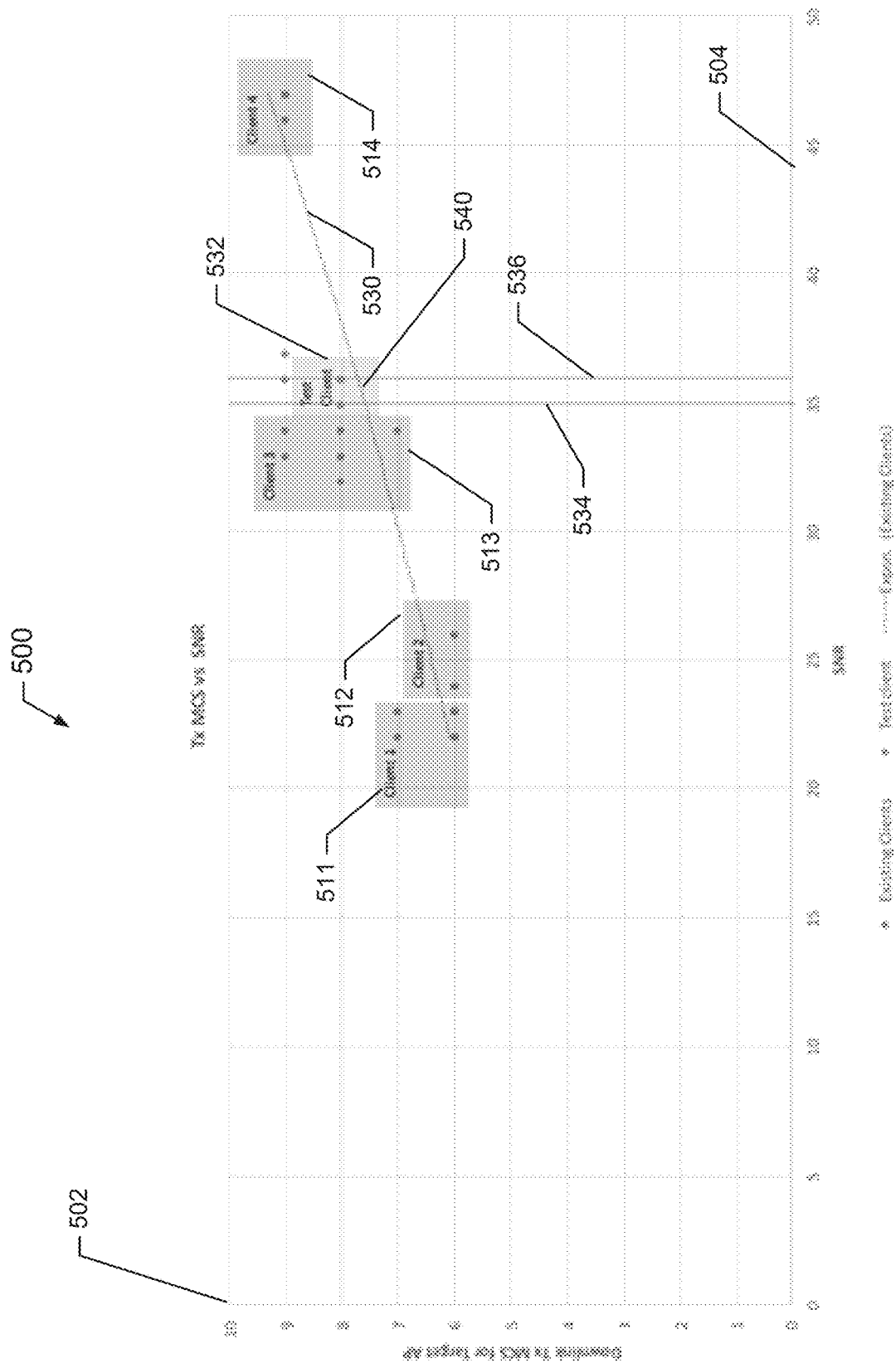
FIG. 5 shows an example graph of downlink transmit modulation coding scheme versus last acknowledgement signal-to-noise ratio for a plurality of measured client devices.

For example, FIG. 5 shows a graph 500 of downlink transmit MCS 502 versus SNR 504 for a plurality of measured client devices 511-514. In the example graph 500 of FIG. 5, target AP transmit power was set at 21 dB, and the four client devices 511-514 were kept at various distances while bidirectional traffic is passed. Readings of Downlink Transmit MCS rate 502 and Last_ACK_SNR 504 are obtained for all clients 511-514 and used to plot a trend line 530 on the graph 500.

As shown in the example of FIG. 5, clients 511-514 were associated with the target AP, and a test client 532 scans the target AP and provide receive SNR readings 534, 536 for the test client 532 from off-channel scanning of the target AP. A location 540 at which SNR lines 534, 536 intersect the trendline 530 (e.g., exponential in nature) indicates an approximate downlink Transmit MCS rate for the target AP to the client device under consideration (e.g., the test client 532). To validate the downlink transmit MCS rate, the test client 532 is connected to the target AP and passed bidirectional traffic. Test client 532 values are plotted on the graph 500 and remained consistent for the test client 532. Thus, an approximate downlink transmit rate for a target AP to a client device is (e.g., MCS 8 in the example of FIG. 5).

One note, however, is that if a target AP has zero and/or one client associated, an estimation of downlink transmit rate may be unavailable since interpolation and regression cannot be used based on a plurality of existing connected client devices. In that case, the downlink data rate can be set to be the same as the uplink data rate. Although assuming the downlink data rate equals the uplink data rate introduces some error, the error can be ignored since the target AP does not have more than one client and has much less effect on contention for airtime.

Thus, the downlink MCS rate can be estimated for a client device under consideration. The estimate of downlink MCS rate is used to calculate the downlink portion of the VCH calculation in the same way shown and described above for the uplink portion of the VCH calculation. Thus, both the uplink and downlink portions of a VCH value can be calculated for a client device.

The VCH value can be used to grade potential neighbors of the AP to which the client device should be associated. Such grading is created per client. This grading can be used to suggest a next Broadcast Service Set Identifier (BSSID) to roam such as via neighbor reports from 802.11k, QBSS Load IE from 802.11e amendment, etc. The VCH value can also be used in proprietary mechanisms to determine a best match of a client with an AP, for example.

Certain examples provide suggestion(s) and/or recommendation(s) regarding AP association to a client device that is associated with an AP and/or looking to connect with an AP on the network. Certain examples facilitate transition management for a client device between two APs. In certain examples, an AP determines suitability and notifies one or more of its currently associated client devices regarding suitability of it or an adjacent AP to accommodate client device communication. Certain examples dynamically refresh AP VCH calculations as a client device roams and APs appear and disappear from the clients communication range.

Figure 6:
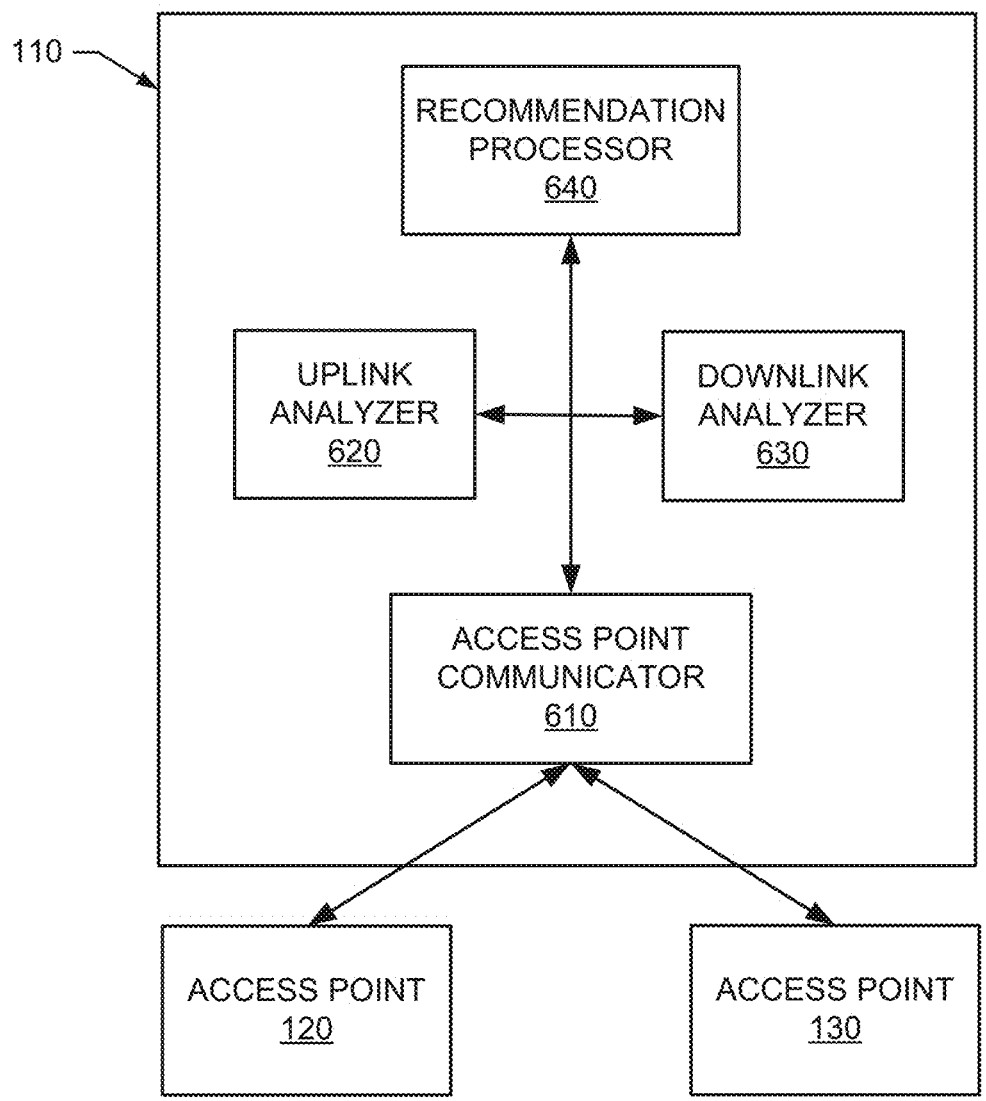
FIG. 6 illustrates a block diagram for an example controller for a network system.

FIG. 6 illustrates a block diagram for an example implementation of the example controller 110 for a network system. The example controller 110 includes an access point communicator 610, an uplink analyzer 620, and a downlink analyzer 630. The elements shown in FIG. 6 can be implemented, for example, in the example controller 110 of FIG. 1, one or more of the example APs 120, 130 of FIG. 1, etc. For example, the controller 110 can be a physical device and/or a virtual device which is running on another hardware or on one or more of the APs 120, 130 as a distributed computing system.

In operation, the AP communicator 610 communicates with one or more APs within communication range, such as APs 120, 130 of the example of FIG. 1, to gather information about their SNR, number of connected client devices, etc. The AP communicator 610 provides information to the uplink analyzer 620 and the downlink analyzer 630 to analyze the uplink and downlink portions of information, respectively, collected from the APs. For example, the uplink analyzer 620 analyzes, for each AP in communication with the example controller 110, an uplink data rate (e.g., MCS1, MCS9, etc.) and a percentage of available airtime for a candidate client device based on a number of currently connected client devices for that AP (e.g., 100%, 50%, 33%, 25%, etc.). The downlink analyzer 630 analyzes and interpolates, for each AP in communication with the example controller 110, an estimated downlink data rate from the AP to each connected client device and a percentage of available airtime for the candidate client device based on the number of currently connected client devices for that AP.

The uplink analyzer 620 and the downlink analyzer 630 provide output to the recommendation processor 640, which combines the effective uplink data rate from the uplink analyzer 620 and the effective downlink data rate from the downlink analyzer 630 to determine a virtual client health with respect to each available AP (e.g., APs 120, 130). The recommendation processor 640 determines, based on the VCH score for each available AP with respect to the candidate client device, a recommendation of a desirable AP to which the candidate client device can connect. The recommendation processor 640 provides a recommendation, such as an ordered list of recommended APs, etc., to be sent by the AP communicator 610 to the APs within communication range of the candidate client device (e.g., APs 120, 130).

In some examples, an AP can use the recommendation (e.g., the ordered list) to influence a client device to move to another AP. For example, an AP can advertise a higher load to one or more of its currently connected client devices to influence the client device(s) to associate with a different AP per the ordered list of recommendations.

While example implementations of the example controller 110, APs 120, 130 and client devices 140, 150 are illustrated in FIGS. 1-6, elements, processes and/or devices illustrated in FIGS. 1-6 may be combined, divided, rearranged, omitted, eliminated and/or implemented in any other way. Further, example controller 110; the example APs 120, 130; the example client devices 140, 150; and/or, more generally, the example network system 100, 200, may be implemented by hardware, machine readable instructions, software, firmware and/or any combination of hardware, machine readable instructions, software and/or firmware. Thus, for example, any of the example controller 110; the example APs 120, 130; the example client devices 140, 150; and/or, more generally, the example network system 100, 200 can be implemented by analog and/or digital circuit(s), logic circuit(s), programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example controller 110; the example APs 120, 130; the example client devices 140, 150; and/or, more generally, the example network system 100, 200 is/are hereby expressly defined to include a tangible computer readable storage device or storage disk such as a memory, a digital versatile disk (DVD), a compact disk (CD), a Blu-ray disk, etc. storing the software and/or firmware. Further still, the examples of FIGS. 1-6 can include elements, processes and/or devices in addition to, or instead of, those illustrated in FIGS. 1-6, and/or may include more than one of any or all of the illustrated elements, processes and devices.

Figure 7:
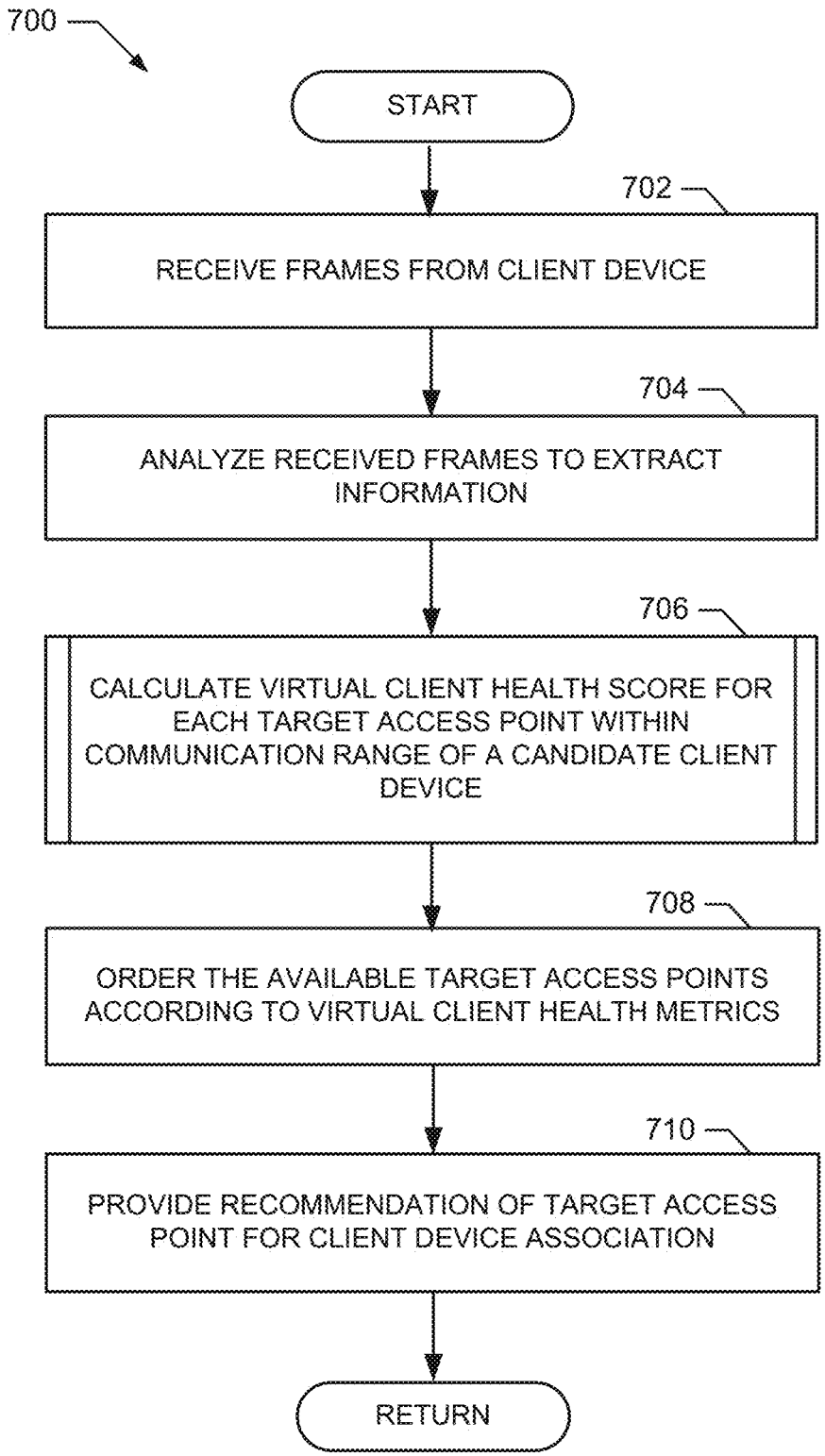
FIG. 7 is an example flowchart representative of example machine readable instructions that may be executed by an example controller and/or access point to determine a recommendation for access point connection for a client device.

A flowchart representative of example machine readable instructions for controlling and/or operating the example controller 110 and/or APs 120, 130 of FIGS. 1-6 to determine a recommendation of an AP for client device connection is shown in FIG. 7. In the example, the machine readable instructions form a program for execution by a processor such as the processor 912 shown in the example processor platform 900 discussed below in connection with FIG. 9. The program may be embodied in machine readable instructions stored on a tangible computer readable storage medium such as a CD-ROM, a floppy disk, a hard drive, a digital versatile disk (DVD), a Blu-ray disk, firmware, or a memory associated with the processor 912, but the entire program and/or parts thereof could alternatively be executed by a device other than the processor 912 and/or embodied in firmware or dedicated hardware. Further, although the example program is described with reference to the flowchart illustrated in FIG. 7, many other methods of controlling and/or operating the example controller 110 and/or APs 120, 130 of FIGS. 1-6 may alternatively be used. For example, the order of execution of the blocks may be changed, and/or some of the blocks described may be changed, eliminated, or combined.

As mentioned above, the example process of FIG. 7 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, firmware, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example process of FIG. 7 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, firmware, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

FIG. 7 is an example flowchart 700 representative of example machine readable instructions that may be executed by the example controller 110 and/or APs 120, 130 of FIGS. 1-6 to determine a recommendation of an AP to which a candidate client device can be connected.

At block 702, frames are received from a client device. At block 704, the received frames are analyzed to extract information. For example, AP client table and transmission rate information can be shared with a processor conducting a connection analysis, such as the example controller 110 and/or APs 120, 130. As described above with respect to FIG. 6, the uplink analyzer 620 and downlink analyzer 630 of the example controller 110 can extract the information from the received beacon frames.

At block 706, a virtual client health score is calculated for each available AP 120, 130 within communication range of the candidate client device 140, 150 based on the extracted information. For example, as described above, a VCH can be calculated as described with respect to Equations 1-4 by the example recommendation processor 640 based on results from the example uplink analyzer 620 and the example downlink analyzer 630.

At block 708, the available APs 120, 130 are ordered or ranked based on desirable VCH scores. For example, APs 120, 130 are ordered from highest VCH score to lowest VCH score in order of desirability for the candidate client device 140, 150. That is, the AP 120, 130 with the highest VCH score in the group is ranked first, and the AP 120, 130 with the lowest VCH score in the group is ranked last in terms of recommended preference for association/connection by the candidate client device 140, 150.

At block 710, the recommendation of target AP for association is provided to the candidate client device 140, 150. For example, the ordered list of AP recommendations and/or the top AP recommendation can be sent by the controller 110 and/or APs 120, 130 (e.g., via the example AP communicator 610) to the candidate client device 140, 150. Alternatively or in addition, an AP 120, 130 with which the client device 140, 150 is currently associated can inform and/or instruct the client device 140, 150 and/or attempt to influence behavior of the client device by artificially inflating an indication of a current load on that AP 120, 130. Such an indication of increased load can prompt the client device 140, 150 to re-evaluate and look for a more beneficial AP connection (e.g., based on the ordered recommendation list, etc.).

Thus, the process 700 can be used to determine a desirable AP for connection by a client device (e.g., a new connection to the network, a change in association between APs for a client device already on the network, etc.). The process 700 can be dynamically executed and executed continuously and/or periodically to help ensure that a client device 140, 150 is beneficially associated with an AP 120, 130, and that load is distributed/balanced between client devices 140, 150 and APs 120, 130 in a network system 100, 200. In some examples, the process 700 executes when a candidate client device 140, 150 is roaming and APs 120, 130 are appearing and disappearing from communication range of the client device 140, 150.

Figure 8:
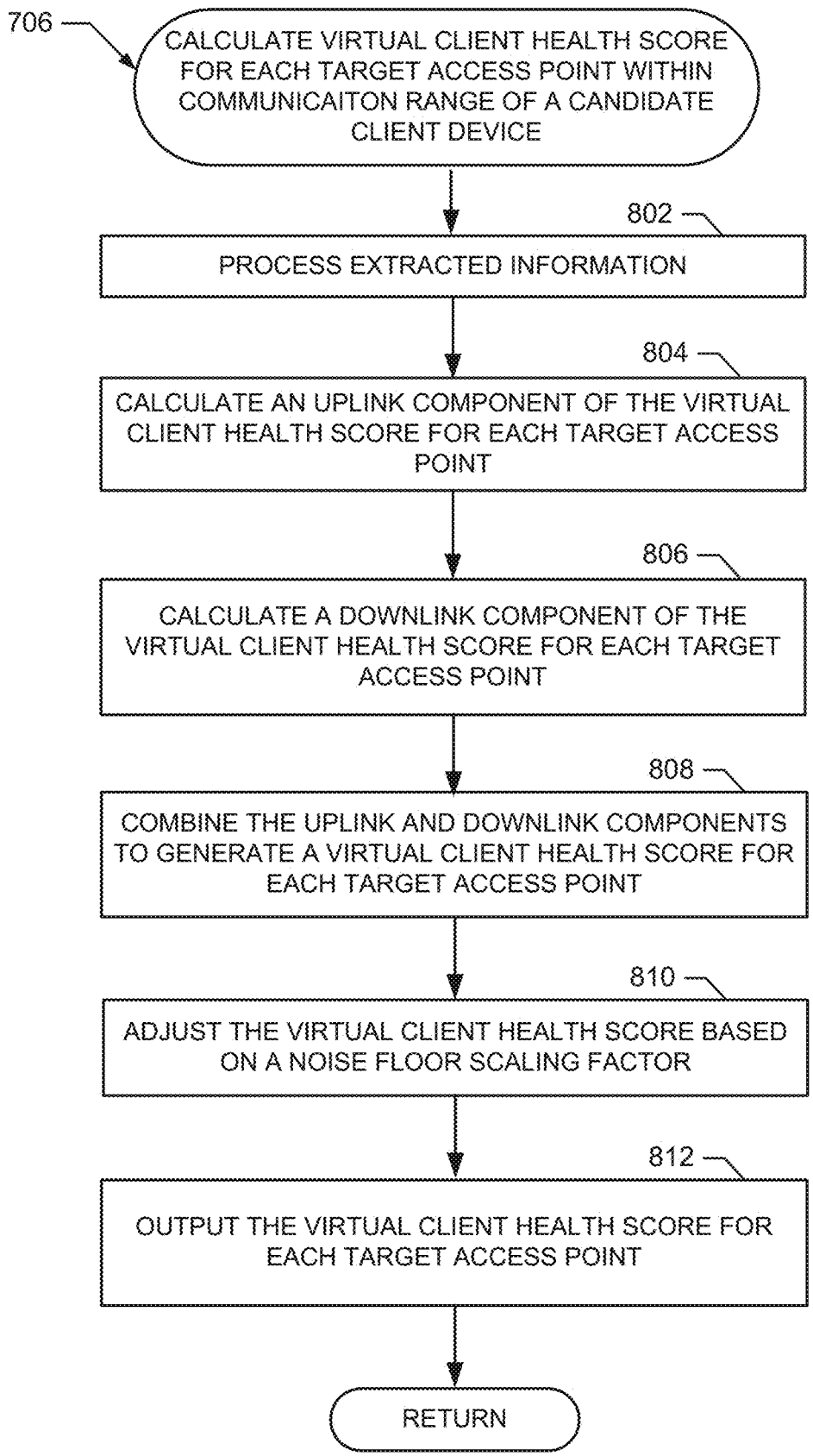
FIG. 8 is an example flowchart representative of example machine readable instructions that may be executed by an example controller and/or access point and provides additional detail regarding an example implementation of the flowchart of FIG. 7.

FIG. 8 is an example flowchart representative of example machine readable instructions that may be executed by the example controller 110 and/or APs 120, 130 of FIGS. 1-6 to determine a recommendation of an AP to which a candidate client device can be connected. The example flowchart of FIG. 8 provides additional detail regarding an example implementation of block 706 of the flowchart of FIG. 7 to calculate a virtual client health score for each available AP 120, 130 within communication range of the candidate client device 140, 150.

At block 802, information regarding data rate and number of currently connected clients for each of the plurality of APs 120, 130 within communication range of the candidate client device 140, 150, such as AP client table and transmission rate information, etc., is processed for use in calculating VCH scores. For example, the extracted information can be formatted, normalized, stored in variables/parameters, etc., to be used in calculating VCH metrics according to Equations 1-20 described above.

At block 804, an uplink component of the VCH score is calculated for each available AP 120, 130. For example, the uplink component of the VCH score can be calculated by the example uplink analyzer 620 using an uplink data rate (e.g., MCS1, MCS9, etc.) between a candidate client device 140, 150 and a target AP 120, 130, along with a number of currently connected client devices 140, 150 and their data rates as described above with respect to Equations 5-18 and the examples associated with FIGS. 2-3. Thus, the uplink component, also referred to as an effective uplink data rate for the target AP 120, 130 is calculated based on an analysis of an uplink data rate on the target AP 120, 130 multiplied by a percentage of uplink airtime available to the candidate client device 140, 150 on the target AP 120, 130, when factoring in other client devices 140, 150 already associated with the target AP 120, 130.

At block 806, a downlink component of the VCH score is calculated for each available AP 120, 130. For example, the downlink component of the VCH score can be calculated by the example downlink analyzer 630 using a downlink data rate (e.g., MCS1, MCS9, etc.) for each client device 140, 150 currently connected to a target AP 120, 130, along with the number of currently connected client devices 140, 150, as described above with respect to Equations 19-20 and the examples associated with FIGS. 4-5. Thus, the downlink component, also referred to as an effective downlink data rate for the target AP 120, 130 is calculated based on an analysis of a downlink data rate for clients 140, 150 on the target AP 120, 130 multiplied by a percentage of uplink airtime available to the candidate client device 140, 150 on the target AP 120, 130, when factoring in other client devices 140, 150 already associated with the target AP 120, 130.

At block 808, the uplink and downlink components are combined to generate a VCH score for each available AP 120, 130. For example, as described above with respect to Equations 1-4, the uplink component (e.g., the effective uplink data rate) and the downlink component (e.g., the effective downlink data rate) can be summed by the example recommendation processor 640 for each target AP 120, 130 to generate a VCH score for that AP 120, 130 with respect to the candidate client device 140, 150. In some examples, the uplink and/or downlink components are multiplied by a weight or factor (e.g., $\alpha$, $\beta$, respectively) that forms an uplink to downlink traffic ratio, which can be used to adjust the computation to emphasize the uplink component, emphasize the downlink component, or weight them equally.

At block 810, the VCH is adjusted based on a noise floor scaling factor. In certain examples, a noise floor associated with each AP 120, 130 is evaluated to determine whether the AP should be considered as a target AP. For example, a noise floor is a measure of a signal created from noise sources and unwanted signals near an AP. A noise floor can be determined for a channel near an AP radio based on noise and signals apart from the channel for that AP radio. Periodically, an AP radio calibrates itself to measure the ambient energy it detects in the absence of a signal (e.g., a Wi-Fi signal). This ambient energy is referred to as the ambient noise floor. When the AP radio receives a packet, it measures a strength of the received signal with respect to the ambient noise floor. The higher the signal level, the better the SNR and the higher likelihood of successful decoding the packet.

Additionally, certain non-Wi-Fi interferers in the vicinity of an AP radio, such as video bridges, microwave ovens, cordless phones, etc., manifest as an increased ambient noise floor or are sensed as non-Wi-Fi channel utilization by the AP radio. The increased ambient noise floor may interfere with the packet reception at the receiver and, in some cases, may cause the AP radio to cease operation due to an inability to find medium time to send its beacons, for example.

Thus, the VCH calculation can incorporate noise floor and non-Wi-Fi energy as a scaling factor based on the following formula:

$$VCH_{effective} = \gamma * VCH \qquad (Eq.\ 21).$$

A sample setting for values of gamma ($\gamma$) is illustrated as follows. For example, a good radio frequency (RF) signal is provided for an AP 120, 130 when the ambient noise floor is weaker than or equal to −96 dBm (decibel-milliwatts) and non-Wi-Fi utilization is between 0% and 10%. If so, then gamma equals 1. In another example, a moderate RF signal is provided when the ambient noise floor is between −80 dBm and −96 dBm and non-Wi-Fi utilization is greater than 50% ($\gamma$=0.5). In another example, a bad RF signal is provided when the ambient noise floor is stronger than −75 dBm ($\gamma$=0). When comparing between two AP radios to which a client device can be associated, a comparison of $VCH_{effective}$ can be performed using gamma as a noise floor scaling factor (e.g., eliminating APs with a gamma of 0 and reducing the import of APs with a gamma less than 1).

At block 812, the VCH scores for each available AP 120, 130 are output. For example, the calculated VCH scores for each available AP 120, 130 are returned to block 708 of the example process 700 of FIG. 7 for an ordering or ranking of the APs 120, 130 based on desirability for connection by the candidate client device 140, 150.

Figure 9:
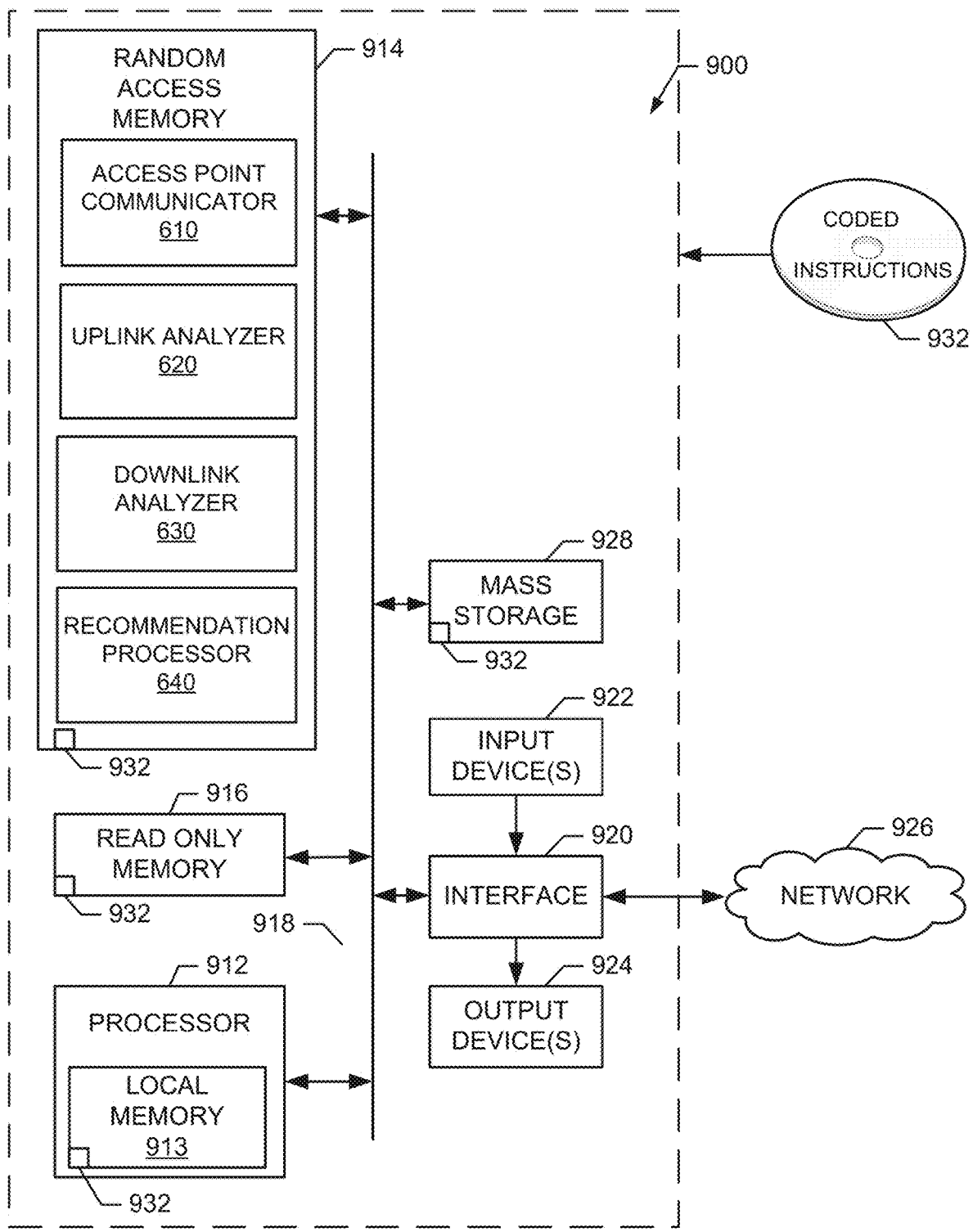
FIG. 9 is a processor platform to execute the instructions of FIGS. 7-8 to implement example controller of FIG. 6 and control operation of the example controller and access points of FIGS. 1-6.

FIG. 9 is a processor platform to execute the instructions of FIGS. 7-8 to implement example controller 110 of FIG. 6 and control operation of the example controller 110 and access points 120, 130 of FIGS. 1-6. The processor platform 900 can be, for example, a server, a personal computer, a mobile device (e.g., a cell phone, a smart phone, a tablet such as an iPad™), a personal digital assistant (PDA), an Internet appliance, or any other type of computing device.

The processor platform 900 of the illustrated example includes a processor 912. The processor 912 of the illustrated example is hardware. For example, the processor 912 can be implemented by one or more integrated circuits, logic circuits, microprocessors or controllers from any desired family or manufacturer.

The processor 912 of the illustrated example includes a local memory 913 (e.g., a cache). The processor 912 executes the instructions of FIGS. 7-8 to implement the example controller 110 and/or AP 120, 130 including the example access point communicator 610, the example uplink analyzer 620, the example downlink analyzer 630, and the example recommendation processor 640 of FIG. 6. The processor 912 of the illustrated example is in communication with a main memory including a volatile memory 914 and a non-volatile memory 916 via a bus 918. The volatile memory 914 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 916 may be implemented by flash memory and/or any other desired type of memory device. Access to the main memory 914, 916 is controlled by a memory and/or clock controller.

The processor platform 900 of the illustrated example also includes an interface circuit 920. The interface circuit 920 may be implemented by any type of interface standard, such as an Ethernet interface, a universal serial bus (USB), and/or a PCI express interface.

In the illustrated example, one or more input devices 922 are connected to the interface circuit 920. The input device(s) 922 permit(s) a user to enter data and commands into the processor 912. The input device(s) can be implemented by, for example, an audio sensor, a microphone, a keyboard, a button, a light emitting diode (LED), a mouse, a touchscreen, a track-pad, a trackball, isopoint and/or a voice recognition system.

One or more output devices 924 are also connected to the interface circuit 920 of the illustrated example. The output devices 924 can be implemented, for example, by a display device (e.g., a light emitting diode (LED), an organic light emitting diode (OLED), a liquid crystal display, a cathode ray tube display (CRT), etc.), a touchscreen, a tactile output device, an audio output device (e.g., a speaker), and/or a data output device (e.g., a network card, modem, cable, etc.). The interface circuit 920 of the illustrated example, thus, typically includes a graphics driver card, a graphics driver chip, a graphics driver processor, sound card, audio processor, network communications chip, modem processor, etc.

The interface circuit 920 of the illustrated example also includes a communication device such as a transmitter, a receiver, a transceiver, a modem and/or network interface card to facilitate exchange of data with external machines (e.g., computing devices of any kind) via a network 926 (e.g., an Ethernet connection, a digital subscriber line (DSL), a telephone line, coaxial cable, a cellular telephone system, etc.).

The processor platform 900 of the illustrated example also includes one or more mass storage devices 928 for storing software and/or data. Examples of such mass storage devices 928 include floppy disk drives, hard drive disks, compact disk drives, Blu-ray disk drives, RAID systems, and digital versatile disk (DVD) drives.

The coded instructions 932 of FIGS. 7-8 may be stored in the mass storage device 928, in the volatile memory 914, in the non-volatile memory 916, and/or on a removable tangible computer readable storage medium such as a CD or DVD.

From the foregoing, it will be appreciated that the above disclosed method, apparatus, and articles of manufacture provide an improved calculation of virtual client device at each available access point for a given client device on a network. Using examples herein, better recommendations can be generated and provided to manage client devices and balance load among available access points for network communication and infrastructure management. Examples disclosed herein focus on the network infrastructure, rather than a single client device that is unconcerned for other client devices, and provide overall access point stability and load balancing in the network topology and system. Virtual client health metrics generated herein can be used by both the network infrastructure as well as particular client devices to improve AP selection and network operation.

Example methods and apparatus are disclosed to generate one or more recommendations for access point association by a client device. Such an example method includes calculating, based on data received from a first access point on a wireless network within a communication range of an identified client device, a first effective uplink data rate for the client device with respect to the first access point based on a) an uplink data rate for the first access point and b) a percentage of uplink airtime available to the client device via the first access point based on a number of devices connected to the first access point. Example methods include calculating, based on data received from the first access point, a first effective downlink data rate for the client device with respect to the first access point based on a) a downlink data rate for the first access point and b) a percentage of downlink airtime available to the client device via the first access point based on a number of devices connected to the first access point, wherein the downlink data rate for the first access point is estimated based on a signal to noise ratio with respect to the first access point. Example methods include computing a first virtual client health metric for the first access point based on the first effective uplink data rate, the first effective downlink data rate, and a noise floor scaling factor. Example methods include generating a recommendation for access point connection by the client device based on a comparison of the first virtual client health metric for the first access point and a second metric computed for a second access point.

Examples are disclosed to implement an apparatus including a processor particularly configured to generate a recommendation for access point connection. The example processor is configured to generate the recommendation by calculating, based on data received from a first access point on a wireless network within a communication range of an identified client device, a first effective uplink data rate for the client device with respect to the first access point based on a) an uplink data rate for the first access point and b) a percentage of uplink airtime available to the client device via the first access point based on a number of devices connected to the first access point. The example processor is configured to generate the recommendation by calculating, based on data received from the first access point, a first effective downlink data rate for the client device with respect to the first access point based on a) a downlink data rate for the first access point and b) a percentage of downlink airtime available to the client device via the first access point based on the number of devices connected to the first access point, wherein the downlink data rate for the first access point is estimated based on a signal to noise ratio with respect to the first access point. The example processor is configured to generate the recommendation by computing a first metric for the first access point based on the first effective uplink data rate, the first effective downlink data rate, and a noise floor scaling factor. The example processor is configured to generate the recommendation by generating the recommendation for access point connection by the client device based on a comparison of the first metric for the first access point and a second metric computed for a second access point.

Examples are disclosed to implement a computer readable medium including instructions that, when executed, cause a machine to generate a recommendation for access point connection by the client device. The example instructions, when executed, cause the machine to calculate, based on data received from a first access point on a wireless network within a communication range of an identified client device, a first effective uplink data rate for the client device with respect to the first access point based on a) an uplink data rate for the first access point and b) a percentage of uplink airtime available to the client device via the first access point based on a number of devices connected to the first access point. The example instructions, when executed, also cause the machine to calculate, based on data received from the first access point, a first effective downlink data rate for the client device with respect to the first access point based on a) a downlink data rate for the first access point and b) a percentage of downlink airtime available to the client device via the first access point based on the number of devices connected to the first access point, wherein the downlink data rate for the first access point is estimated based on a signal to noise ratio with respect to the first access point. The example instructions, when executed, cause the machine to compute a first metric for the first access point based on the first effective uplink data rate, the first effective downlink data rate, and a noise floor scaling factor. The example instructions, when executed, cause the machine to generate the recommendation for access point connection by the client device based on a comparison of the first metric for the first access point and a second metric computed for a second access point.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A method comprising:
    calculating, based on data received from a first access point on a wireless network within a communication range of an identified client device, a first effective uplink data rate for the client device with respect to the first access point based on a) an uplink data rate for the first access point and b) a percentage of uplink airtime for the first access point that is available to the client device based on uplink data and uplink data rates for devices that are connected to the first access point;
    calculating, based on data received from the first access point, a first effective downlink data rate $VCH_D$ for the client device with respect to the first access point based on formula $$VCH_D = \frac{DD_C/DDR_C}{\sum_{i=1}^{n} \frac{DD_i}{DDR_i}} * DDR_C$$

wherein $DD_C$ represents downlink data sent by the client device, $DDR_C$ represents a downlink data rate of the client device, $DD_i$ represents downlink data sent by another device connected to the first access point, and $DDR_i$ represents a downlink data rate of another device connected to the first access point, wherein the downlink data rate for the first access point is estimated based on a signal to noise ratio with respect to the first access point;
    computing a first metric for the first access point based on the first effective uplink data rate, the first effective downlink data rate, and a noise floor scaling factor; and
    generating a recommendation for access point connection by the client device based on a comparison of the first metric for the first access point and a second metric computed for a second access point.

2. The method of claim 1, wherein the client device is associated with the second access point.

3. The method of claim 2, wherein the second access point is configured to calculate the first effective uplink data rate and the first effective downlink data rate and compute the first metric.

4. The method of claim 1, wherein a controller is configured to calculate the first metric and the second metric.

5. The method of claim 1, further including ordering a plurality of metrics including the first metric and the second metric to generate an ordered list of recommended access points for association with the client device.

6. The method of claim 1, wherein the first effective uplink data rate is calculated as follows:

$$VCH_U = \frac{UD_C/UDR_C}{\sum_{i=1}^{n} \frac{UD_i}{UDR_i}} * UDR_C,$$

wherein $VCH_U$ represents the first effective uplink data rate as a first uplink component of the first metric, $UD_C$ represents uplink data sent by the client device, $UDR_C$ represents an uplink data rate of the client device, $UD_i$ represents uplink data sent by another device connected to the first access point, and $UDR_i$ represents an uplink data rate of another device connected to the first access point.

7. The method of claim 1, wherein at least one of the first effective uplink data rate or the first effective downlink data rate is weighted according to an uplink to downlink traffic ratio.

8. An apparatus comprising:
a processor particularly configured to generate a recommendation for access point connection by:
calculating, based on data received from a first access point on a wireless network within a communication range of an identified client device, a first effective uplink data rate $VCH_U$ for the client device with respect to the first access point based on formula $$VCH_U = \frac{UD_C/UDR_C}{\sum_{i=1}^{n} \frac{UD_i}{UDR_i}} * UDR_C,$$

wherein UDC represents uplink data sent by the client device, UDRC represents an uplink data rate of the client device, UDi represents uplink data sent by another device connected to the first access point, and UDRi represents an uplink data rate of another device connected to the first access point;
calculating, based on data received from the first access point, a first effective downlink data rate for the client device with respect to the first access point based on a) a downlink data rate for the first access point and b) a percentage of downlink airtime for the first access point that is available to the client device based on downlink data and downlink data rates for the devices that are connected to the first access point, wherein the downlink data rate for the first access point is estimated based on a signal to noise ratio with respect to the first access point;
computing a first metric for the first access point based on the first effective uplink data rate, the first effective downlink data rate, and a noise floor scaling factor; and
generating the recommendation for access point connection by the client device based on a comparison of the first metric for the first access point and a second metric computed for a second access point.

9. The apparatus of claim 8, wherein the client device is associated with the second access point.

10. The apparatus of claim 8, wherein the processor is further configured to order a plurality of metrics including the first metric and the second metric to generate an ordered list of recommended access points for association with the client device.

11. The apparatus of claim 8, wherein the processor is configured to calculate the first effective downlink data rate as follows:

$$VCH_D = \frac{DD_C/DDR_C}{\sum_{i=1}^{n} \frac{DD_i}{DDR_i}} * DDR_C,$$

wherein $VCH_D$ represents the first effective downlink data rate as a first downlink component of the first metric, $DD_C$ represents downlink data sent by the client device, $DDR_C$ represents a downlink data rate of the client device, $DD_i$ represents downlink data sent by another device connected to the first access point, and $DDR_i$ represents a downlink data rate of another device connected to the first access point.

12. The apparatus of claim 8, wherein the processor is configured to weight at least one of the first effective uplink data rate or the first effective downlink data rate according to an uplink to downlink traffic ratio.

13. A non-transitory computer readable medium comprising instructions that, when executed, cause a machine to:
calculate, based on data received from a first access point on a wireless network within a communication range of an identified client device, a first effective uplink data rate for the client device with respect to the first access point based on a) an uplink data rate for the first access point and b) a percentage of uplink airtime for the first access point that is available to the client device based on uplink data and uplink data rates for devices that are connected to the first access point, wherein the first effective uplink data rate is calculated as follows:

$$VCH_U = \frac{UD_C/UDR_C}{\sum_{i=1}^{n} \frac{UD_i}{UDR_i}} * UDR_C,$$

wherein $VCH_U$ represents the first effective uplink data rate as a first uplink component of the first metric, $UD_C$ represents uplink data sent by the client device, $UDR_C$ represents an uplink data rate of the client device, $UD_i$ represents uplink data sent by another device connected to the first access point, and $UDR_i$ represents an uplink data rate of another device connected to the first access point;

calculate, based on data received from the first access point, a first effective downlink data rate for the client device with respect to the first access point based on a) a downlink data rate for the first access point and b) a percentage of downlink airtime for the first access point that is available to the client device based on downlink data and downlink data rates for the devices that are connected to the first access point, wherein the downlink data rate for the first access point is estimated based on a signal to noise ratio with respect to the first access point;

compute a first metric for the first access point based on the first effective uplink data rate, the first effective downlink data rate, and a noise floor scaling factor, wherein at least one of the first effective uplink data rate or the first effective downlink data rate is weighted according to an uplink to downlink traffic ratio; and generate a recommendation for access point connection by the client device based on a comparison of the first metric for the first access point and a second metric computed for a second access point.

14. The non-transitory computer readable medium of claim 13, wherein the first effective downlink data rate is calculated as follows:

$$VCH_D = \frac{DD_C/DDR_C}{\sum_{i=1}^{n} \frac{DD_i}{DDR_i}} * DDR_C,$$

wherein $VCH_D$ represents the first effective downlink data rate as a first downlink component of the first metric, $DD_C$ represents downlink data sent by the client device, $DDR_C$ represents a downlink data rate of the client device, $DD_i$ represents downlink data sent by another device connected to the first access point, and $DDR_i$ represents a downlink data rate of another device connected to the first access point.

\* \* \* \* \*